United States Patent
Hwang et al.

(10) Patent No.: US 8,787,922 B2
(45) Date of Patent: Jul. 22, 2014

(54) SYSTEM AND METHOD FOR COOPERATIVE INTER-CELL INTERFERENCE CONTROL

(75) Inventors: Hyo Sun Hwang, Seoul (KR); Kyung Hun Jang, Suwon-si (KR); Hyun Ho Choi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1032 days.

(21) Appl. No.: 12/774,759

(22) Filed: May 6, 2010

(65) Prior Publication Data

US 2011/0014924 A1    Jan. 20, 2011

(30) Foreign Application Priority Data

Jul. 15, 2009    (KR) ................ 10-2009-0064388

(51) Int. Cl.
*H04W 72/00*    (2009.01)

(52) U.S. Cl.
USPC ........ 455/450; 455/451; 455/452.1; 455/436; 455/444

(58) Field of Classification Search
USPC ............. 455/422.1, 446, 447; 370/329, 330
See application file for complete search history.

(56) References Cited

U.S. PATENT DOCUMENTS

| | | | |
|---|---|---|---|
| 6,792,276 B1 * | 9/2004 | Butovitsch et al. | 455/453 |
| 8,068,785 B2 * | 11/2011 | Ahn et al. | 455/63.1 |
| 8,121,604 B1 * | 2/2012 | Schwinghammer | 455/444 |
| 2003/0137951 A1 * | 7/2003 | Otsuka et al. | 370/328 |
| 2008/0039022 A1 * | 2/2008 | Wei et al. | 455/69 |
| 2008/0132262 A1 | 6/2008 | Jung et al. | |
| 2008/0299981 A1 | 12/2008 | Foschini | |
| 2009/0069023 A1 * | 3/2009 | Ahn et al. | 455/450 |

FOREIGN PATENT DOCUMENTS

| | | |
|---|---|---|
| JP | 2003-199144 A | 7/2003 |
| KR | 10-2007-0086976 A | 8/2007 |
| KR | 10-2007-0018237 A | 12/2007 |
| KR | 10-2007-0118237 | 12/2007 |
| KR | 10-2008-0069174 A | 7/2008 |
| WO | WO 2009/019079 A1 | 2/2009 |
| WO | WO 2009/024614 A2 | 2/2009 |
| WO | WO 2009/024614 A3 | 2/2009 |

* cited by examiner

*Primary Examiner* — Lester Kincaid
*Assistant Examiner* — Dung Lam
(74) *Attorney, Agent, or Firm* — NSIP Law

(57) ABSTRACT

A system to cooperatively control inter-cell interference is provided. A first frequency allocated to a central area of a serving cell associated with a serving base station may be allocated to a central area of a neighboring cell associated with a neighboring base station. A second frequency allocated to an edge area of the serving cell may be allocated to an edge area of the neighboring cell. Where a terminal is located in the edge of the neighboring cell, scheduling information, channel information, and data may be exchanged between the terminal and the serving base station.

15 Claims, 10 Drawing Sheets

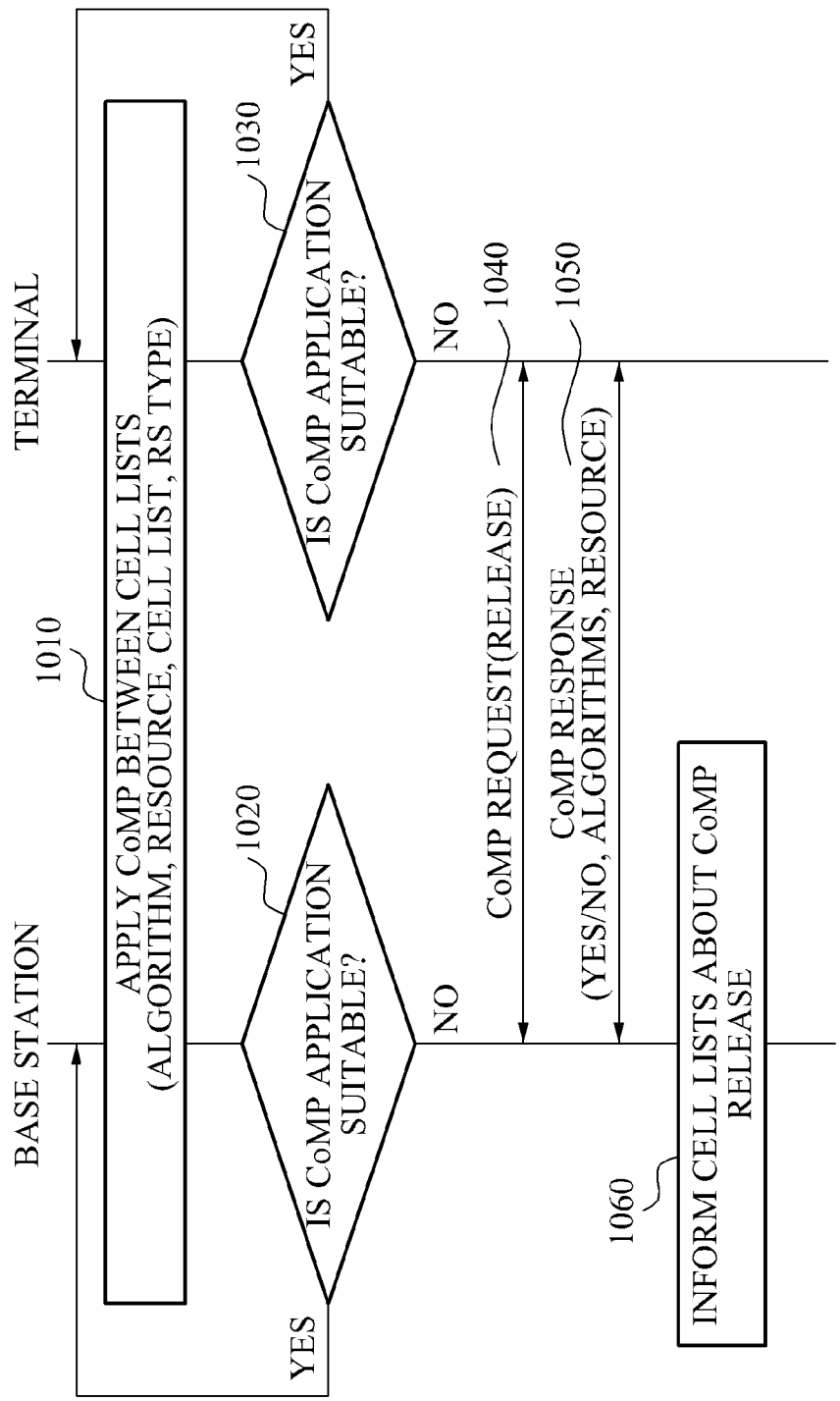

SYSTEM AND METHOD FOR COOPERATIVE INTER-CELL INTERFERENCE CONTROL

CROSS-REFERENCE TO RELATED APPLICATION

This application claims the benefit under 35 U.S.C. §119(a) of a Korean Patent Application No. 10-2009-0064388, filed on Jul. 15, 2009, in the Korean Intellectual Property Office, the entire disclosure of which is incorporated herein by reference for all purposes.

BACKGROUND

1. Field

The following description relates to a system and method of cooperatively controlling inter-cell interference.

2. Description of Related Art

There has been a substantial increase in the development and use of various types of radio communication technologies. In addition to voice information, data information may also be quickly transmitted using a $3^{rd}$ generation (3G) radio communication technology called International Mobile Telecommunication (IMT)-2000 via a Code Division Multiple Access (CDMA) communication technology that is a $2^{nd}$ generation (2G) radio communication technology. However, in response to the IMT-2000, a wireless broadband Internet (WiBro) (i.e., a next generation radio communication system) is being developed to provide data services at faster data rates than the IMT-2000.

Performing precise additional frequency allocation within a few GHz may be difficult to embody a new radio communication. In addition, an allocated frequency band may be limited. Accordingly, frequency interference may occur between different devices.

In a next generation mobile communication field, development of a technology to cooperatively control inter-cell interference may enhance an entire cell capacity and a capacity of an edge user. For example, a coordinated multi-point transmission and reception (CoMP) algorithm may be used. The CoMP algorithm may be classified into a cooperative scheduling (CS) scheme of exchanging only scheduling information, a coordination beamforming (CB) scheme of exchanging the scheduling information and channel information, a joint processing (JP) information scheme of exchanging the scheduling information, the channel information, and data, and the like.

In the conventional JP scheme, a base station may allocate, to a terminal belonging to another base station, a resource denoting that the base station may need to allocate a terminal belonging to the base station. However, application of the JP scheme to the base station may reduce an amount of resources of the terminal belonging to the base station. Accordingly, the JP scheme may most effectively enhance a frequency efficiency in a cell edge, whereas the base station may not actively use the JP scheme.

SUMMARY

In one general aspect, there is provided a system to cooperatively control inter-cell interference including a resource allocation unit to allocate a first frequency to a central area of a neighboring cell associated with a neighboring base station, and to allocate a second frequency to an edge area of the neighboring cell, wherein the first frequency is allocated to a central area of a serving cell associated with a serving base station, and the second frequency is allocated to an edge area of the serving cell, and an interference controller to control a least one of scheduling information, channel information, and data to be transmitted and be received between a terminal and the serving base station using the second frequency, where the terminal is located in the edge area of the neighboring cell.

The resource allocation unit may receive, from the serving base station, an authorization to use the second frequency, and may allocate the second frequency to the edge area of the neighboring cell.

The system may further include a status decision unit to determine an application status regarding a use of a first algorithm at the serving base station by transmitting, to the serving base station, application status information that includes the first algorithm used at the neighboring base station, and by receiving, from the serving base station, a response to the application status information, an application decision unit to determine whether a second algorithm determined based on the application status information is available, where a support request corresponding to a use of the second algorithm is received from the terminal, and to use the second algorithm at the neighboring base station where the second algorithm is available, and an operation performing unit to perform a transmission and reception operation according to the second algorithm at the neighboring base station.

The status decision unit may transmit, to the serving base station, the application status information that further include a system load, or a number of terminals supported at the neighboring base station.

The status decision unit may designate an application zone of a coordinated multipoint transmission and reception (CoMP) based on a signal processing capability of the neighboring base station or an idle resource of the neighboring base station, and may transmit, to the serving base station, the status application information that further includes the designated application zone of the CoMP.

Where an acceptance response to the support request is received from cluster base stations associated with the serving base station or the neighboring base station, the application decision unit may determine the second algorithm is available, and where a denied response is received from the cluster base stations, the application decision unit may perform an algorithm coordination corresponding to the second algorithm to determine again whether the second algorithm is available.

The terminal may determine whether the first algorithm is available, based on at least one of a signal status that is based on a signal-to-noise ratio (SNR) of the neighboring base station and a signal-to-interference and noise ratio (SINR) of the neighboring base station, a mobility status, a power status, a signal processing capability, and an idle resource, and where the first algorithm is determined to be available, the terminal may collect channel information based on a reference signal transmitted from cluster base stations associated with the serving base station or the neighboring base station, and may transmit the support request based on the collected channel information.

The system may further include a transmitter to periodically update the application status information, and to transmit the updated application status information to the terminal.

The system may further include an operation release unit to release an operation, where at least one of a radio resource use status of the neighboring base station, a signal processing capability, and a link delay between the neighboring base station and the serving base station does not satisfy a predetermined operational condition.

In another general aspect, there is provided a terminal including a receiver to receive, from a base station, application status information that includes a first algorithm used for a coordinated multipoint transmission and reception (CoMP), a decision unit to determine whether the first algorithm is available based on the application status information, a collection unit to collect channel information based on a reference signal transmitted from cluster base stations associated with the base station, where the first algorithm is determined to be available, and an algorithm decision unit to determine a second algorithm based on the channel information.

The decision unit may determine whether the first algorithm is available, based on at least one of a signal status that is based on an SNR of the base station and an SINR of the base station, a mobility status, a power status, a signal processing capability, and an idle resource.

The terminal may further include an operation release unit to release an operation, where at least one of a velocity, a data rate, a power, an algorithm support capability, and a channel status does not satisfy a predetermined operational condition.

In still another general aspect, there is provided a method of cooperatively controlling inter-cell interference between multiple cells including allocating a first frequency to a central area of a neighboring cell associated with a neighboring base station, wherein the first frequency is allocated to a central area of a serving cell associated with a serving base station, allocating a second frequency to an edge area of the neighboring cell, wherein the second frequency is allocated to an edge area of the serving cell, and controlling interference between the serving cell and the neighboring cell by exchanging at least one of scheduling information, channel information, and data between a terminal and the serving base station using the second frequency, where a terminal is located in the edge area of the neighboring cell.

The method may further include determining an application status regarding a CoMP by transmitting, to the serving base station, application status information that includes a first algorithm used at the neighboring base station, and by receiving, from the serving base station, a response to the application status information, determining whether a second algorithm determined based on the application status information is available, where a support request for a use of the second algorithm is received from the terminal, to use the second algorithm at the neighboring base station, where the second algorithm is available, and performing an operation associated with the CoMP according to the second algorithm at the neighboring base station.

The determining of the application status may include transmitting, to the serving base station, the application status information that further includes at least one of a system load of the neighboring base station, a number of terminals supported at the neighboring base station, and an application zone of the CoMP.

The determining of whether the second algorithm is available may include determining the second algorithm is available, where an acceptance response to the support request is received from cluster base stations associated with the serving base station or the neighboring base station, and performing an algorithm coordination for the second algorithm to determine again whether the second algorithm is available, where a denied response is received from the cluster base stations.

In still another general aspect, there is provided a computer-readable storage medium storing a program to cooperatively control inter-cell interference between multiple cells, including instructions to cause a computer to allocate a first frequency to a central area of a neighboring cell associated with a neighboring base station, wherein the first frequency is allocated to a central area of a serving cell associated with a serving base station, allocate a second frequency to an edge area of the neighboring cell, wherein the second frequency is allocated to an edge area of the serving cell, and control interference between the serving cell and the neighboring cell by exchanging at least one of scheduling information, channel information, and data between a terminal and the serving base station using the second frequency, where a terminal is located in the edge area of the neighboring cell.

Other features and aspects will be apparent from the following detailed description, the drawings, and the claims.

BRIEF DESCRIPTION OF THE DRAWINGS

FIGS. 6 through 10 are flowcharts illustrating an exemplary method of cooperatively controlling inter-cell interference.

Figure 1:
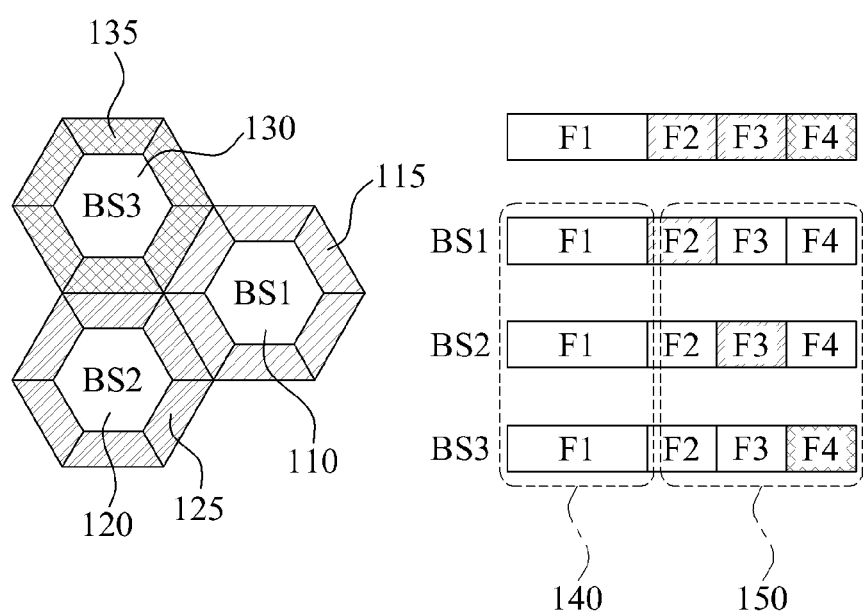
FIG. 1 is a diagram illustrating an exemplary resource allocation corresponding to each coordinated multi-point transmission reception (CoMP) algorithm in a fractional frequency reuse (FFR) environment.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses and/or systems described herein. Various changes, modifications, and equivalents of the systems, apparatuses and/or methods described herein will be suggested to those of ordinary skill in the art. Descriptions of well-known functions and constructions may be omitted for increased clarity and conciseness.

FIG. 1 illustrates an exemplary resource allocation corresponding to each CoMP algorithm in a fractional frequency reuse (FFR) environment.

Referring to FIG. 1, it is assumed that a frequency F1 is allocated to a base station 1 (BS1) 110, a base station 2 (BS2) 120, and a base station 3 (BS3) 130, and frequencies F2, F3, and F4 are allocated to edge areas 115, 125, and 135, respectively. In the FFR environment, an interval 140 corresponding to the frequency F1 may be available to perform coordination beamforming (CB) and joint processing (JP). An interval 150 corresponding to orthogonal frequencies F2, F3, and F4 may be available to perform cooperative scheduling (CS).

In the FFR environment, a JP scheme may use a simultaneously available resource between neighboring base stations. In the JP scheme, since a base station allocates to a terminal belonging to another base station, a resource that the base station may need to allocate to a terminal belonging to the base station, resources used corresponding to terminals belonging to the base station may decrease.

Accordingly, proposed is a method of applying the JP scheme using the frequencies F2, F3, and F4 that are orthogonally allocated between each of the base stations BS1, BS2, and BS3.

Figure 2:
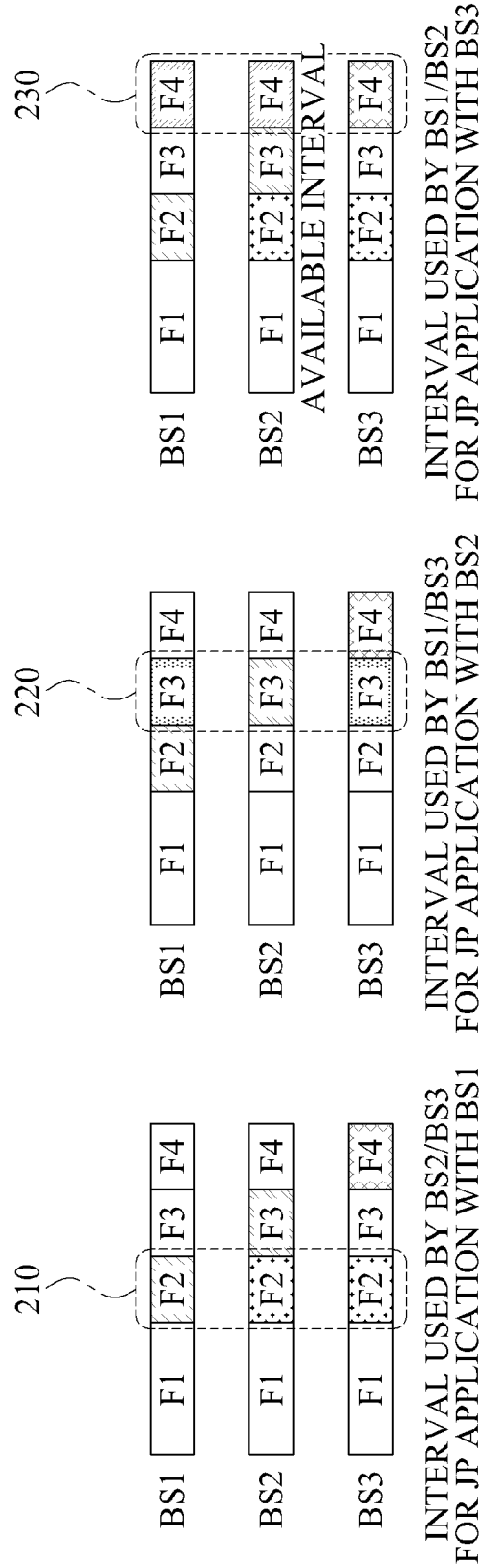
FIG. 2 is a diagram illustrating an exemplary resource allocation which applies a joint processing (JP) scheme.

FIG. 2 illustrates an exemplary resource allocation to apply a JP scheme.

As illustrated in FIG. 2, BS2 and BS3 use the JP scheme based on a frequency F2 210 to perform cooperative communication with BS1. The BS1 and the BS3 use the JP scheme based on a frequency F3 220 to perform cooperative communication with the BS2. The BS1 and the BS2 use the JP scheme based on a frequency F4 230 to perform cooperative communication with the BS3.

Figure 3:
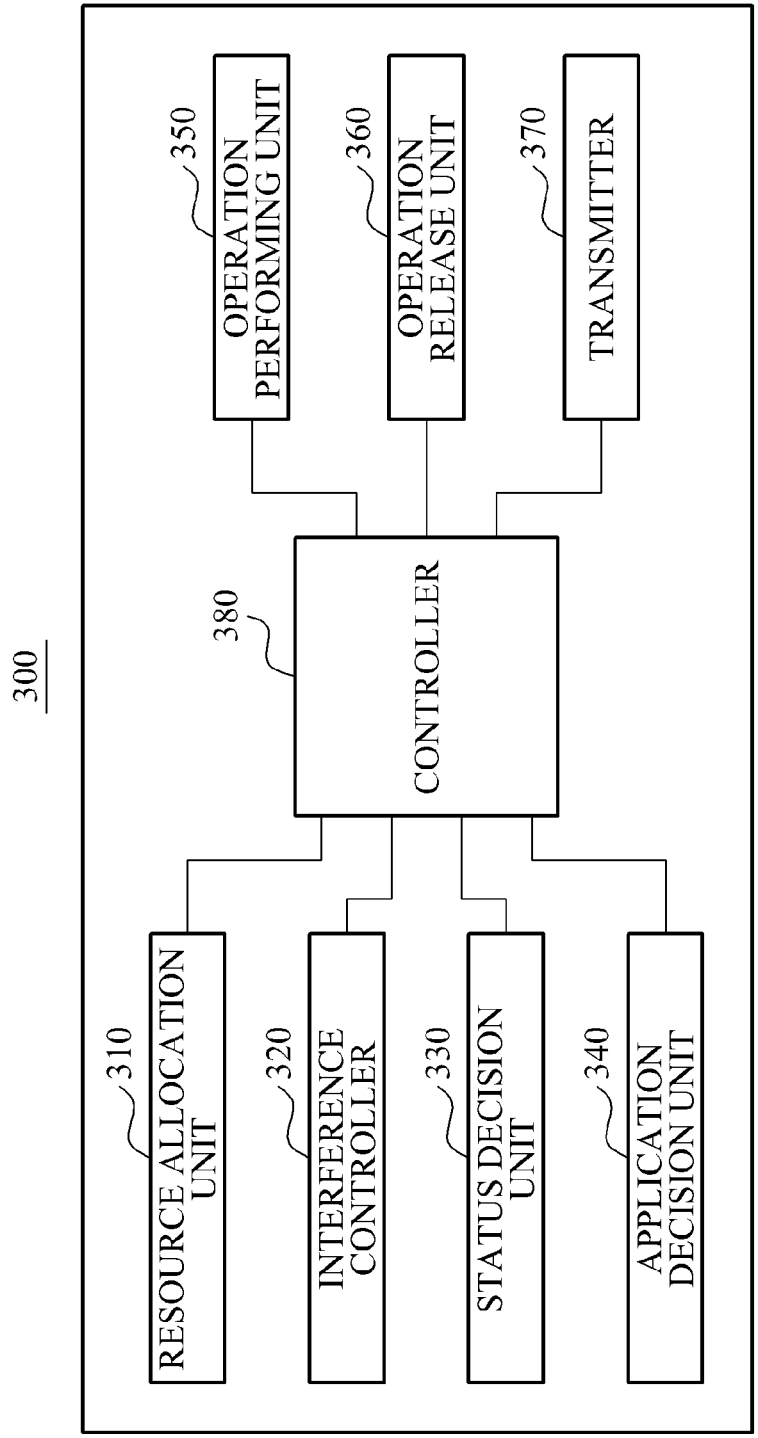
FIG. 3 is a block diagram illustrating an exemplary configuration of a system to cooperatively control inter-cell interference.

FIG. 3 illustrates an exemplary configuration of a system 300 to cooperatively control inter-cell interference. Referring to FIG. 3, a base station will be described based on a serving base station that is included in a serving cell, and a neighboring base station that is included in a neighboring cell and that is adjacent to the serving base station. The cooperative inter-cell interference control system 300 may be installed in the neighboring base station.

Referring to FIG. 3, the cooperative inter-cell interference control system 300 includes a resource allocation unit 310 and an interference controller 320.

The resource allocation unit 310 may allocate, to a central area of the neighboring cell, a first frequency that is allocated to a central area of the serving cell. The resource allocation unit 310 may allocate, to an edge area of the neighboring cell, a second frequency that is allocated to an edge area of the serving cell. In this instance, the resource allocation unit 310 may receive, from the serving base station, an authorization to use the second frequency, and may allocate the second frequency to the edge area of the neighboring cell.

Where a terminal is located in the edge area of the neighboring cell, the interference controller 320 may control interference between the serving cell and the neighboring cell by exchanging at least one of the second frequency, scheduling information, channel information, and data between the terminal and the serving base station using the second frequency. For example, the interference controller 320 may control the inter-cell interference by using a frequency that is orthogonally allocated between neighboring base stations such as the second frequency, which is different from the existing JP scheme of using a frequency that is equally allocated between the neighboring base stations such as the first frequency.

The cooperative inter-cell interference control system 300 is constructed to support the aforementioned interference control mechanism, and thus further includes a status decision unit 330, an application decision unit 340, an operation performing unit 350, an operation release unit 360, a transmitter 370, and a controller 380.

The status decision unit 330 may determine an application status regarding a CoMP by transmitting, to the serving base station, application status information that includes the CoMP (hereinafter, referred to as a first algorithm) used at the neighboring base station, and by receiving, from the serving base station, a response to the application status information, that is, application status information corresponding to the serving base station. Specifically, the status decision unit 330 may determine the application status regarding the CoMP by exchanging the application status information of the serving base station with the application status information of the neighboring base station.

In the example illustrated in FIG. 3, the status decision unit 330 may designate an application zone of the CoMP based on at least one of a signal processing capability of the neighboring base station and an idle resource of the neighboring base station. Also, the status decision unit 330 may transmit, to the serving base station, the application status information that includes at least one of the designated application zone, a system load, and a number of terminals supported at the neighboring base station. The application status information may be transmitted to at least one of the terminals via the transmitter 370. The transmitter 370 may periodically update the application status information and transmit the updated application status information to the terminal.

The application decision unit 340 may receive, from the terminal, a support request to use a CoMP algorithm (hereinafter, referred to as a second algorithm) that is determined to be applied to the terminal. Here, the terminal may apply the second algorithm based on the updated application status information.

In association with the support request, the application decision unit 340 may also receive, from the terminal, support request information that includes the second algorithm, a location in the application zone, an active cluster cell, channel information corresponding to each cell, and the like. The support request information may include a plurality of sets using a scheme of differently selecting a parameter and a threshold value used corresponding to an algorithm selection, based on a CoMP application capability of the neighboring base station.

The application decision unit 340 may determine whether the second algorithm is available based on the support request information. Where the second algorithm is determined to be available, the application decision unit 340 may use the second algorithm at the neighboring base station. Specifically, in response to the support request, the application decision unit 340 may transmit the support request information, for example, a first set among the plurality of sets, to cluster base stations associated with the neighboring base station. Where an acceptance response to the support request is received from the cluster base stations, the application decision unit 340 may determine the second algorithm is available and thereby use the second algorithm at the neighboring base station. Accordingly, as a response to the support request from the terminal, the neighboring base station may transmit, to the terminal, matters associated with the application decision, for example, an application decision algorithm, a resource, and the like.

Conversely, where a denied response to the support request is received from the cluster base stations, the application decision unit 340 may determine the second algorithm is unavailable and thereby perform an algorithm coordination corresponding to the second algorithm to another CoMP algorithm (hereinafter, referred to as a third algorithm). For example, the application decision unit 340 may receive, from the terminal, support request information, for example, a second set among the plurality of sets, that is associated with the third algorithm, and thereby determine whether the third algorithm is available. Where the third algorithm is available, the application decision unit 340 may use the third algorithm at the neighboring base station. Conversely, where the third algorithm is unavailable, the application decision unit 340 may receive support request information of a remaining set among the plurality of sets and then repeat the above process.

The operation performing unit 350 may perform an operation associated with the CoMP according to the second algorithm or the third algorithm, for example. Where the second algorithm or the third algorithm is associated with the JP scheme, the operation performing unit 350 may perform the operation associated with the CoMP using the second frequency. Accordingly, the operation performing unit 350 may provide an environment where the inter-cell interference may be cooperatively controlled using the interference controller 320.

Where the operation associated with the CoMP does not satisfy a predetermined operational condition (hereinafter, a first operational condition), the operation release unit 360 may release the operation associated with the CoMP. For example, where at least one of a radio resource use status of the neighboring base station, a signal processing capability, a link delay between the neighboring base station and the serving base station does not satisfy the first operational condition, the operation release unit 360 may release the operation associated with the CoMP.

Also, the terminal may check whether the operation associated with the CoMP satisfies a predetermined operational condition (hereinafter, a second operational condition). Where the second operational condition is not satisfied, the terminal may release the operation associated with the CoMP. For example, where a velocity, a data rate, a power, an algorithm support capability, a channel status, and the like does not satisfy the second operational condition, the terminal may release the operation associated with the CoMP.

The controller 380 may control the cooperative inter-cell interference control system 300. For example, the controller 380 may control operations of the resource allocation unit 310, the interference controller 320, the status decision unit 330, the application decision unit 340, the operation performing unit 350, the operation release unit 360, and the transmitter 370.

Figure 4:
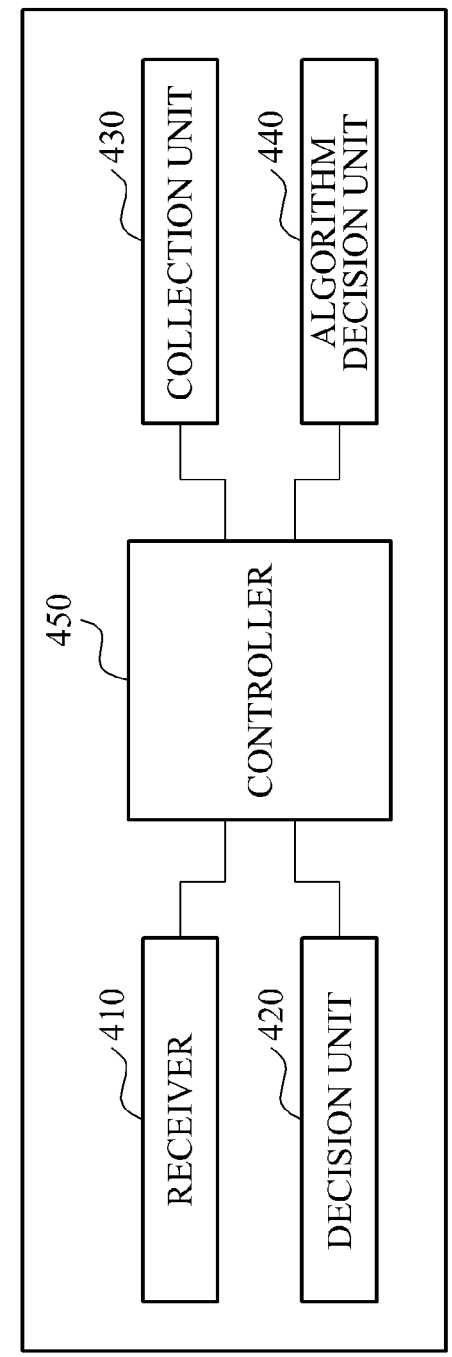
FIG. 4 is a block diagram illustrating another exemplary configuration of a system to cooperatively control inter-cell interference.

FIG. 4 illustrates another exemplary configuration of a system 400 to cooperatively control inter-cell interference. The cooperative inter-cell interference control system 400 may be installed in a terminal that receives a service from a neighboring base station.

Referring to FIG. 4, the cooperative inter-cell interference control system 400 includes a receiver 410, a decision unit 420, a collection unit 430, an algorithm decision unit 440, and a controller 450.

The receiver 410 may receive, from a base station, for example, a neighboring base station, application status information that includes a first algorithm used to perform a CoMP.

The decision unit 420 may determine whether the first algorithm is available based on the application status information. For example, the decision unit 420 may determine whether the first algorithm is available, based on at least one of a signal status that is based on signal-to-noise ratio (SNR) of the base station and a signal-to-interference and noise ratio (SINR) of the base station, a mobility status, a power status, a signal processing capability, and an idle resource thereof.

Where the first algorithm is determined to be available, the collection unit 430 may collect channel information based on a reference signal that is transmitted from cluster neighboring base stations associated with the base station.

The algorithm decision unit 440 may determine a second algorithm applicable to be used at the terminal based on the channel information.

The controller 450 may control the cooperative inter-cell interference control system 400. For example, the controller 450 may control operations of the receiver 410, the decision unit 420, the collection unit 430, and the algorithm decision unit 440.

The cooperative inter-cell interference control system 400 may further include an operation release unit (as illustrated in FIG. 3) which may release the operation associated with the CoMP. For example, where at least one of a velocity of the terminal a data rate, a power, an algorithm support capability, and a channel status does not satisfy a predetermined operational condition, the operation release unit may release the operation associated with the CoMP.

Figure 5:
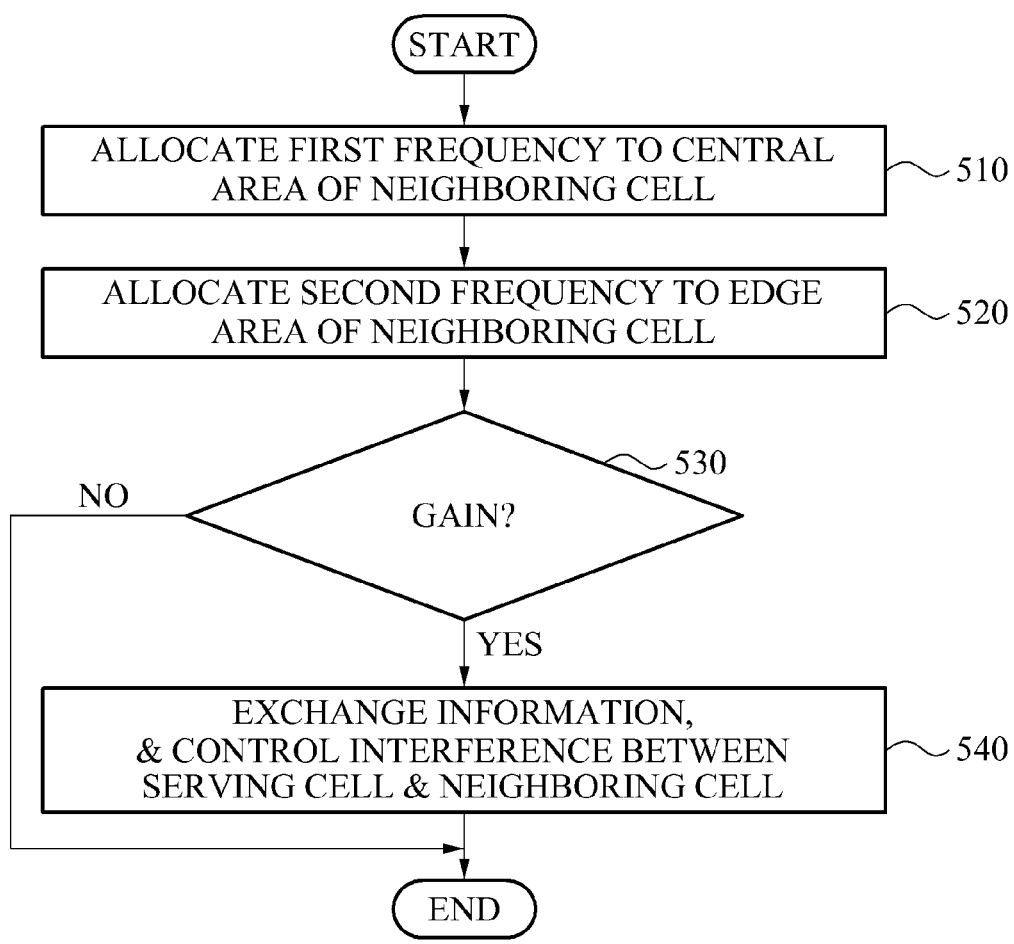
FIG. 5 is a flowchart illustrating an exemplary method of cooperatively controlling inter-cell interference.

FIG. 5 illustrates an exemplary method of cooperatively controlling inter-cell interference. The cooperative inter-cell interference control method of FIG. 5 may be performed by a neighboring base station that is adjacent to a serving base station, included in a serving cell, and that is included in a neighboring cell.

Referring to FIG. 5, at 510, the neighboring base station allocates, to a central area of the neighboring cell, a first frequency that is allocated to a central area of the serving cell.

At 520, the neighboring base station allocates, to an edge area of the neighboring cell, a second frequency that is allocated to an edge area of the serving cell.

For this, the neighboring base station may receive, from the serving base station, a permission to use the second frequency through a predetermined authorization process.

At 530, the neighboring base station determines whether a gain exists in applying a CoMP to a neighboring base station. Here, the neighboring base station may determine whether a terminal is located in the edge area of the neighboring base station.

Where the gain exists, the neighboring base station controls interference between the serving cell and the neighboring cell by exchanging at least one of scheduling information, channel information, and data between the terminal and the serving base station using the second frequency at 540. Conversely, where the gain does not exist, the neighboring base station may terminate the process.

Hereinafter, a scheme to support the above interference control mechanism will be described.

FIGS. 6 through 10 illustrate an exemplary method of cooperatively controlling inter-cell interference.

Figure 6:
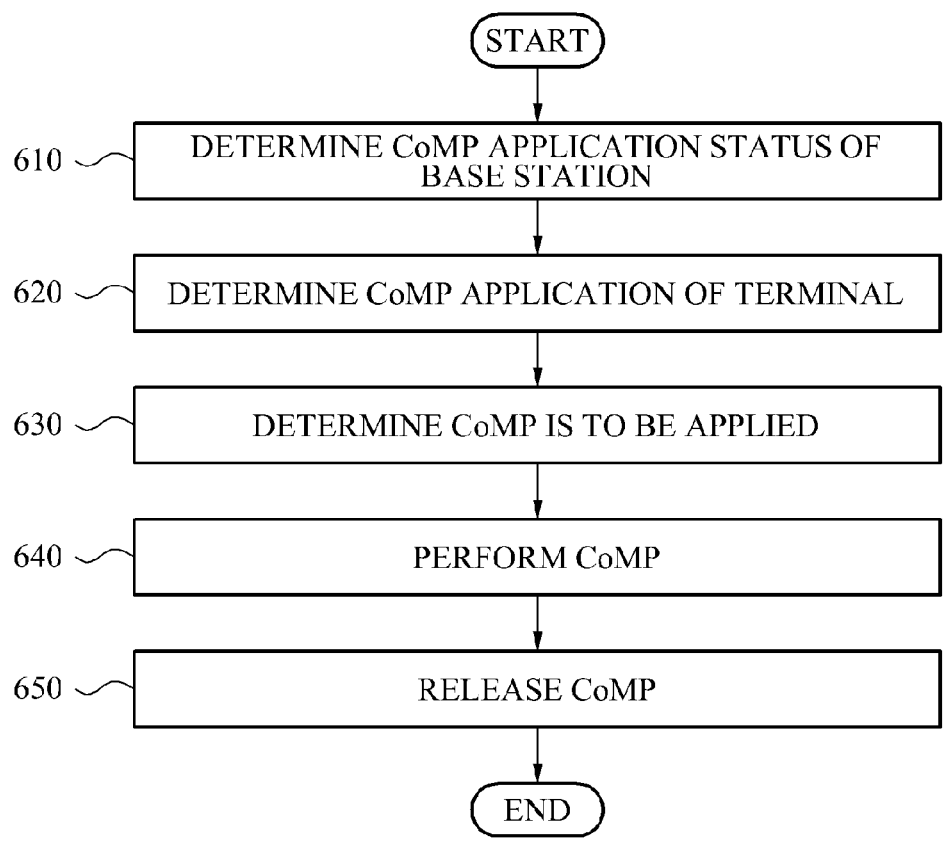

Referring to FIG. 6, at 610, a base station determines its CoMP application status.

Figure 7:
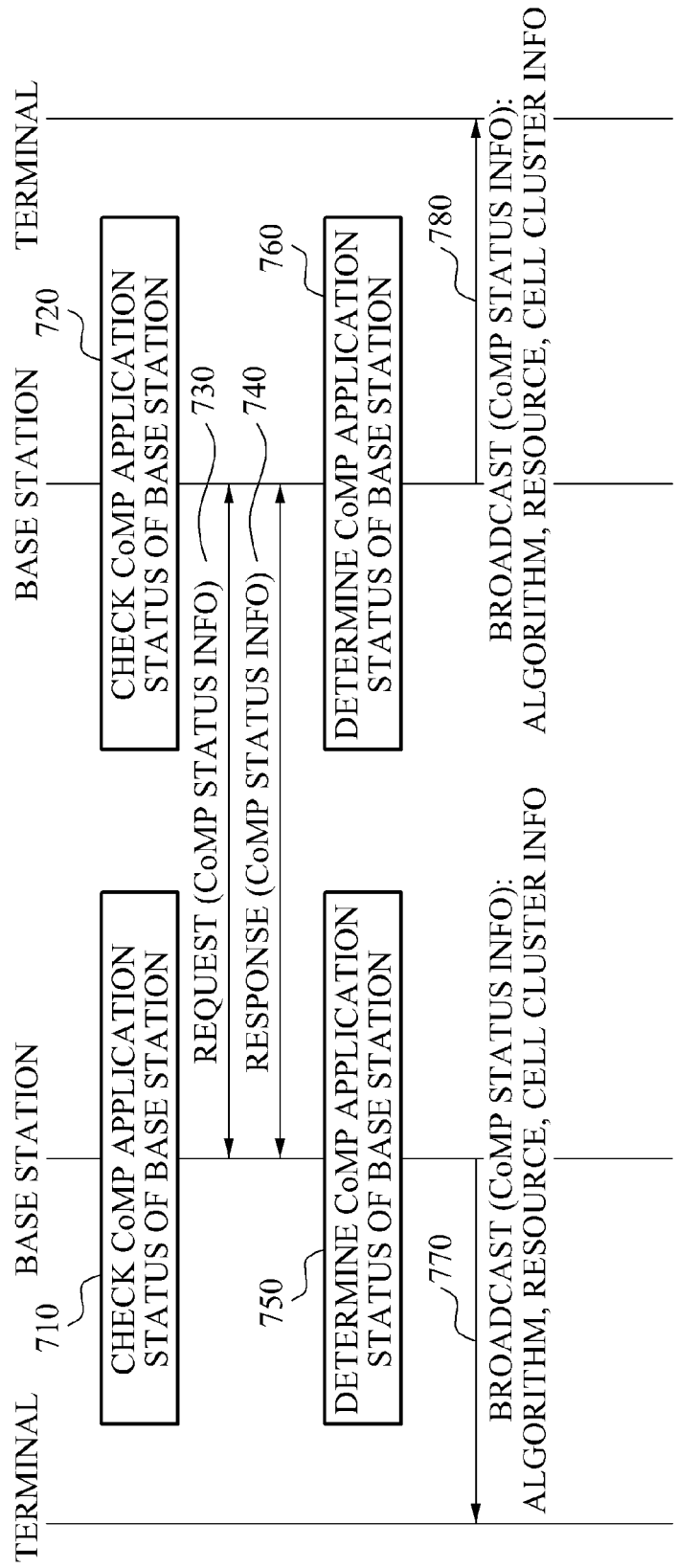

As illustrated in FIG. 7, at 710 and 720, each base station checks its CoMP application status.

Each base station transmits, to its neighboring base station, a request that includes application status information at 730, and receives, from the neighboring base station, a response to the request.

At 750 and 760, each base station determines its CoMP application status through the above process of exchanging the request and the response.

At 770 and 780, each base station broadcasts, to its corresponding terminal, the application status information that includes, for example, an algorithm, a resource, cell cluster information, and the like.

Referring again to FIG. 6, at 620, a terminal determines its CoMP application.

Figure 8:
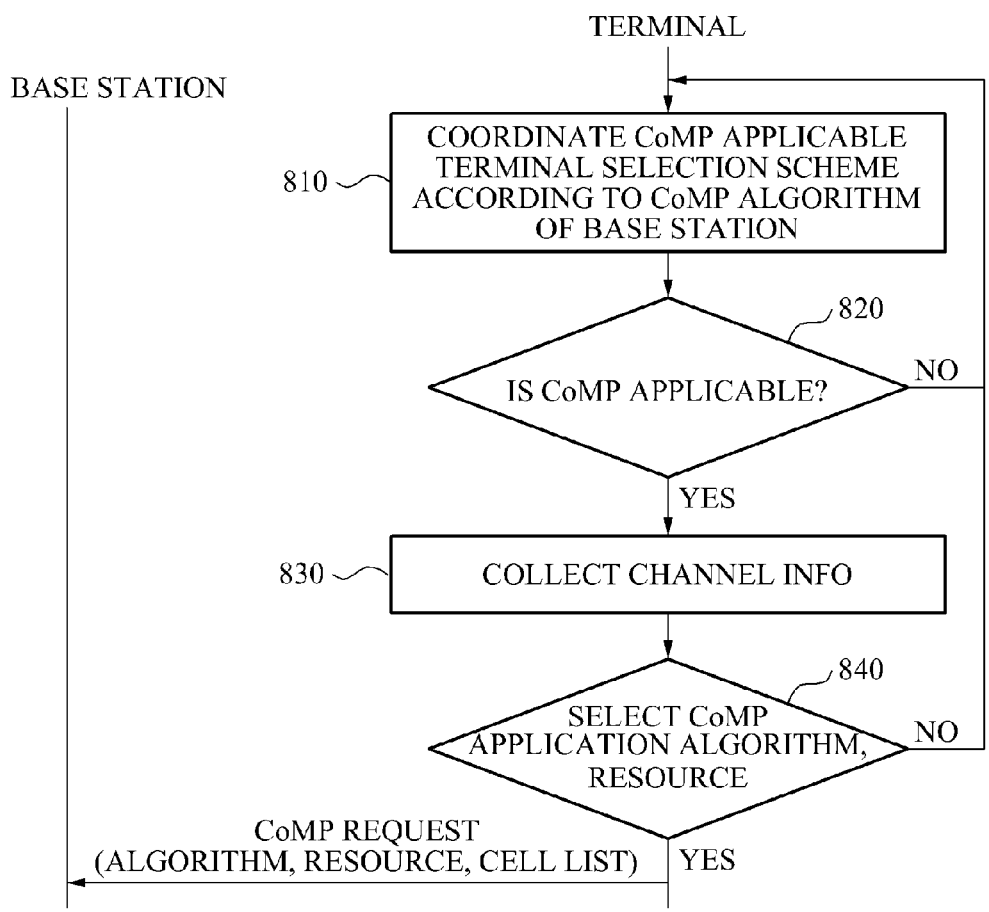

As illustrated in FIG. 8, at 810, a terminal may coordinate a CoMP applicable terminal selection scheme according to a CoMP application algorithm of a base station.

At 820, the terminal determines whether a CoMP is applicable. Where the CoMP is applicable, the terminal collects channel information of a cluster cell at 830. Conversely, where the CoMP is inapplicable, the terminal again performs 810.

Where the CoMP application algorithm, a resource, and the like are selected at 840, the terminal transmits, to the base station, a CoMP request that includes an algorithm, a resource, a cell list, and the like. Conversely, where the CoMP application algorithm, the resource, and the like are not selected in operation 840, the terminal again performs 810.

Referring again to FIG. 6, at 630, the base station determines the CoMP is to be applied.

Figure 9:
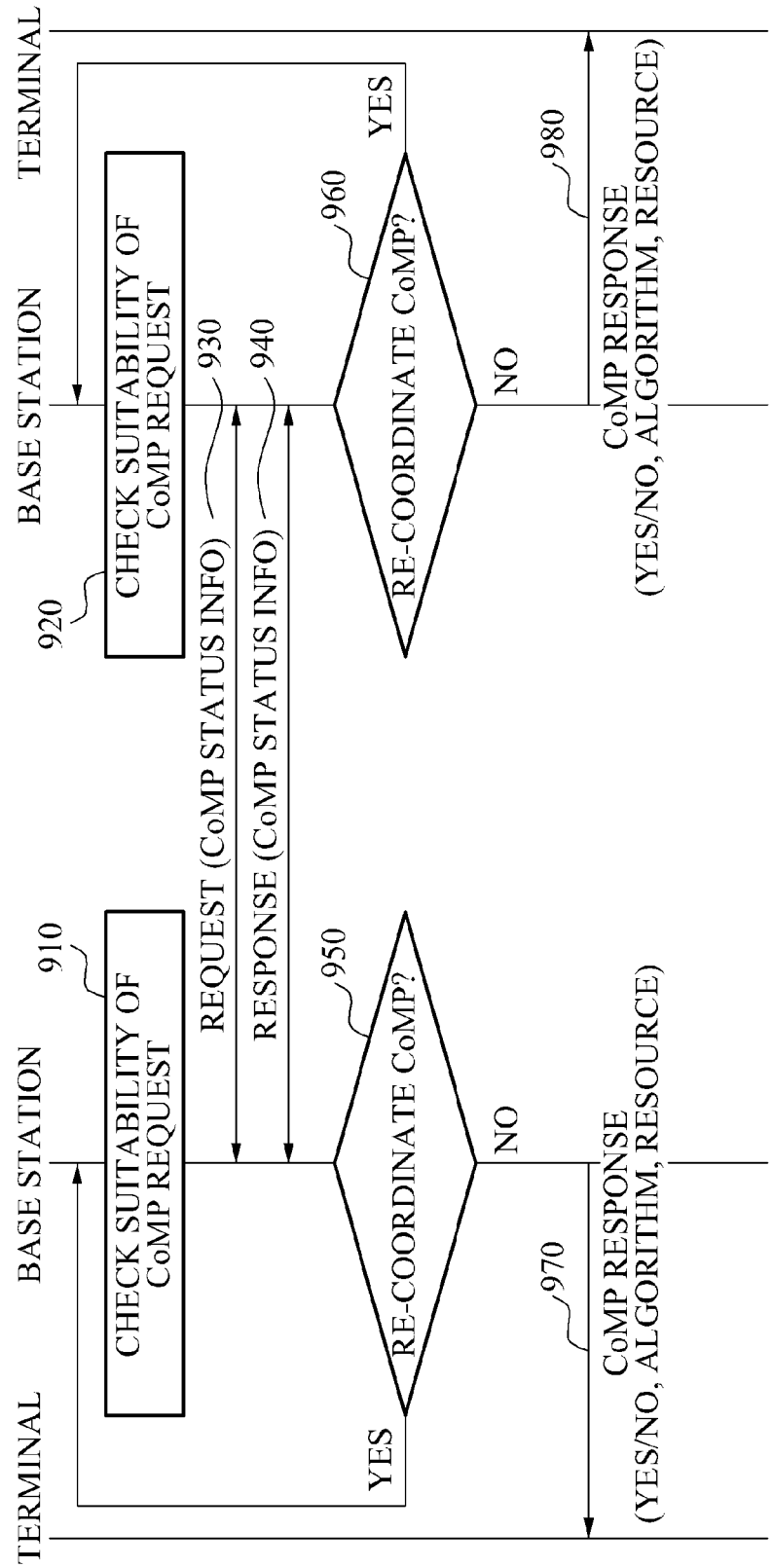

As illustrated in FIG. 9, at 910 and 920, each base station checks a suitability of a CoMP request received from a terminal, and determines whether a CoMP may be performed within a CoMP application zone.

Since an acceptance response to the CoMP request is received from cluster base stations, each base station transmits a support request to use a corresponding application zone algorithm at 930, and receives a response to the support request at 940.

Where there is a need to re-coordinate the CoMP at 950, that is, where a denied response is received, each base station performs 910. Conversely, where there is no need to re-coordinate the CoMP at 950, that is, where an acceptance response is received from the cluster base stations, each base station transmits, to the terminal, information including the re-coordination, the algorithm, the resource, and the like, as the CoMP response at 970. For example, where a denied response is received from the cluster base stations, each base station may request a subsequent set included in the CoMP request to perform the re-coordination for the CoMP.

Referring again to FIG. 6, at 640, the base station performs the CoMP. Where an operation of the base station does not satisfy a predetermined operational condition, the base station releases an operation associated with the CoMP at 650.

As illustrated in FIG. 10, while performing the CoMP at 1010, both the base station and the terminal determine whether the CoMP is applicable at 1020 and 1030, and check whether the operation satisfies the operational condition.

With reference to FIG. 10, the terminal may determine whether the CoMP is applicable, based on a velocity, a data rate, a power, an algorithm support capability, and a channel status. The base station may determine whether the CoMP is applicable, based on a radio resource use state of its neighboring base station, a signal processing capability, a radio link delay with a CoMP application cluster cell, and the like.

Where the operation does not satisfy the operational condition, the base station and the terminal transmit and receive a request to release the CoMP at 1040, and transmit and receive a response to the request at 1050.

At 1060, the base station informs cell lists about that the CoMP is released.

In the above description, performing a coordinated multi-point transmission and reception (CoMP) was described based on two base stations, for example, a serving base station and a neighboring base station. However, a plurality of base stations may perform the CoMP.

The methods and/or operations described above including a cooperative inter-cell interference control method may be recorded, stored, or fixed in one or more computer-readable storage media that includes program instructions to be implemented by a computer to cause a processor to execute or perform the program instructions. The media may also include, alone or in combination with the program instructions, data files, data structures, and the like. The media and program instructions may be those specially designed and constructed, or they may be of the kind well-known and available to those having skill in the computer software arts. Examples of computer-readable media include magnetic media such as hard disks, floppy disks, and magnetic tape; optical media such as CD ROM disks and DVDs; magneto-optical media such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The described hardware devices may be configured to act as one or more software modules in order to perform the operations and methods described above, or vice versa. In addition, a computer-readable storage medium may be distributed among computer systems connected through a network and computer-readable codes or program instructions may be stored and executed in a decentralized manner.

According to certain example(s) described above, resources may be allocated so that a base station may support joint processing (JP) without reducing the amount of resources of a terminal belonging to the base station in a fractional frequency reuse (FFR) environment. Accordingly, inter-cell interference may be cooperatively controlled.

According to certain example(s) described above, a base station may perform a JP scheme using a resource that the base station does not use for a terminal belonging to the base station. Accordingly, the base station may perform the JP scheme without decreasing the capacity.

According to certain example(s) described above, a base station may use a resource that the base station does not use for a terminal belonging to the base station. Accordingly, there may not be a need for an additional resource allocation and it may be possible to decrease the system overhead, for example, a processing overhead, a resource overhead, and the like.

According to certain example(s) described above, since an application zone of a CoMP may be pre-set between base stations, it may be possible to decrease a delay caused by resource setting.

According to certain example(s) described above, it may be possible to enhance the resource use efficiency by periodically updating an application zone of a CoMP.

According to certain example(s) described above, it may be possible to decrease the unnecessary processing overhead of a terminal by broadcasting, to a terminal, a CoMP application probability of a base station.

According to certain example(s) described above, it may be possible to prevent a terminal from unnecessarily measuring channel information by adjusting a CoMP applicable terminal selection scheme.

According to certain example(s) described above, it may be possible to decrease the channel feedback overhead by determining, by a terminal, a COMP application algorithm set.

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A system to cooperatively control inter-cell interference, comprising:
 a processor;
 a resource allocation unit to allocate a first frequency to a central area of a neighboring cell associated with a neighboring base station, and to allocate a second frequency to an edge area of the neighboring cell, wherein the first frequency is allocated to a central area of a serving cell associated with a serving base station, and the second frequency is allocated to an edge area of the serving cell; and an interference controller configured:

to control a least one of scheduling information, channel information, and data to be transmitted and be received between a terminal and the serving base station using the second frequency, where the terminal is located in the edge area of the neighboring cell, to allocate the first frequency equally between the serving base station and the neighboring base station in a first interval, and to allocate the second frequency and a third frequency orthogonally between the serving base station and the neighboring base station during a second interval.

2. The system of claim 1, wherein the resource allocation unit receives, from the serving base station, an authorization to use the second frequency, and allocates the second frequency to the edge area of the neighboring cell.

3. The system of claim 1, further comprising:

a status decision unit to determine an application status regarding a use of a first algorithm at the serving base station by transmitting, to the serving base station, application status information that includes the first algorithm used at the neighboring base station, and by receiving, from the serving base station, a response to the application status information;

an application decision unit to determine whether a second algorithm determined based on the application status information is available, where a support request corresponding to a use of the second algorithm is received from the terminal, and to use the second algorithm at the neighboring base station where the second algorithm is available; and an operation performing unit to perform a transmission and reception operation according to the second algorithm at the neighboring base station.

4. The system of claim 3, wherein the status decision unit transmits, to the serving base station, the application status information that further include a system load, or a number of terminals supported at the neighboring base station.

5. The system of claim 3, wherein the status decision unit designates an application zone of a coordinated multipoint transmission and reception (CoMP) based on a signal processing capability of the neighboring base station or an idle resource of the neighboring base station, and transmits, to the serving base station, the status application information that further includes the designated application zone of the CoMP.

6. The system of claim 3, wherein:

where an acceptance response to the support request is received from cluster base stations associated with the serving base station or the neighboring base station, the application decision unit determines the second algorithm is available, and where a denied response is received from the cluster base stations, the application decision unit performs an algorithm coordination corresponding to the second algorithm to determine again whether the second algorithm is available.

7. The system of claim 3, wherein:

the first algorithm is determined as available, based on at least one of a signal status that is based on a signal-to-noise ratio (SNR) of the neighboring base station and a signal-to-interference and noise ratio (SINR) of the neighboring base station, a mobility status, a power status, a signal processing capability, and an idle resource, and where the first algorithm is determined to be available, a support request is received at the serving base station from the terminal, the support request reflecting collected channel information, at the terminal, based on a reference signal transmitted from cluster base stations associated with the serving base station or the neighboring base station.

8. The system of claim 3, further comprising:

a transmitter to periodically update the application status information, and to transmit the updated application status information to the terminal.

9. The system of claim 3, further comprising:

an operation release unit to release an operation, where at least one of a radio resource use status of the neighboring base station, a signal processing capability, and a link delay between the neighboring base station and the serving base station does not satisfy a predetermined operational condition.

10. The system of claim 1, wherein the resource allocation unit is further configured to determine whether or not a gain exits by applying a coordinated multipoint transmission and reception (COMP) to the neighboring base station, and the interference controller is further configured to control exchanged information between the terminal and the serving base station when gain is determined.

11. A method of cooperatively controlling inter-cell interference between multiple cells, comprising:

allocating a first frequency to a central area of a neighboring cell associated with a neighboring base station, wherein the first frequency is allocated to a central area of a serving cell associated with a serving base station;

allocating a second frequency to an edge area of the neighboring cell, wherein the second frequency is allocated to an edge area of the serving cell;

controlling, by a processor, interference between the serving cell and the neighboring cell by exchanging at least one of scheduling information, channel information, and data between a terminal and the serving base station using the second frequency, where a terminal is located in the edge area of the neighboring cell;

allocating the first frequency equally between the serving base station and the neighboring base station in a first interval; and allocating the second frequency and a third frequency orthogonally between the serving base station and the neighboring base station during a second interval.

12. The method of claim 11, further comprising:

determining an application status regarding a coordinated multipoint transmission and reception (CoMP) by transmitting, to the serving base station, application status information that includes a first algorithm used at the neighboring base station, and by receiving, from the serving base station, a response to the application status information;

determining whether a second algorithm determined based on the application status information is available, where a support request for a use of the second algorithm is received from the terminal, to use the second algorithm at the neighboring base station, where the second algorithm is available; and performing an operation associated with the CoMP according to the second algorithm at the neighboring base station.

13. The method of claim 12, wherein the determining of the application status comprises transmitting, to the serving base station, the application status information that further includes at least one of a system load of the neighboring base station, a number of terminals supported at the neighboring base station, and an application zone of the CoMP.

14. The method of claim 12, wherein the determining whether the second algorithm is available comprises:
- determining the second algorithm is available, where an acceptance response to the support request is received from cluster base stations associated with the serving base station or the neighboring base station; and
- performing an algorithm coordination for the second algorithm to determine again whether the second algorithm is available, where a denied response is received from the cluster base stations.

15. A non-transitory computer-readable storage medium storing a program to cooperatively control inter-cell interference between multiple cells, comprising instructions to cause a computer to:
- allocate a first frequency to a central area of a neighboring cell associated with a neighboring base station, wherein the first frequency is allocated to a central area of a serving cell associated with a serving base station;
- allocate a second frequency to an edge area of the neighboring cell, wherein the second frequency is allocated to an edge area of the serving cell; and
- control interference between the serving cell and the neighboring cell by exchanging at least one of scheduling information, channel information, and data between a terminal and the serving base station using the second frequency, where a terminal is located in the edge area of the neighboring cell, wherein the first frequency is allocated equally between the serving base station and the neighboring base station in a first interval, and the second frequency and a third frequency are allocated orthogonally between the serving base station and the neighboring base station during a second interval.

* * * * *